United States Patent
Siriani et al.

(10) Patent No.: US 11,073,661 B1
(45) Date of Patent: Jul. 27, 2021

(54) OPTICAL WAVEGUIDE EMITTER WITH TURNING WAVEGUIDE SECTION

(71) Applicant: Cisco Technology, Inc., San Jose, CA (US)

(72) Inventors: Dominic F. Siriani, Lansdale, PA (US); Vipulkumar K. Patel, Breinigsville, PA (US); Matthew J. Traverso, Santa Clara, CA (US); Mark A. Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/751,994

(22) Filed: Jan. 24, 2020

(51) Int. Cl.
*G02B 6/293* (2006.01)
(52) U.S. Cl.
CPC ................... *G02B 6/29331* (2013.01)
(58) Field of Classification Search
CPC .................................................. G02B 6/29331
See application file for complete search history.

(56) References Cited

U.S. PATENT DOCUMENTS

| | | | |
|---|---|---|---|
| 8,994,004 B2 | 3/2015 | Bowers | |
| 9,274,275 B2 | 3/2016 | Webster et al. | |
| 10,320,151 B1* | 6/2019 | Traverso | G02B 6/12004 |
| 2007/0189688 A1 | 8/2007 | Dehlinger et al. | |
| 2008/0273567 A1 | 11/2008 | Yariv et al. | |
| 2010/0158429 A1 | 6/2010 | Popovic | |
| 2014/0079082 A1* | 3/2014 | Feng | H01S 5/021 372/20 |
| 2020/0280171 A1* | 9/2020 | Siriani | H01S 5/2031 |

FOREIGN PATENT DOCUMENTS

EP 2854241 A2 4/2015

OTHER PUBLICATIONS

Gordeev et al., "Transverse single-mode edge-emitting lasers based on coupled waveguides," Opt. Lett., 40, 2150, 2015.
I. Moerman, P. Van Daele, and P. Demeester, "A review on fabrication technologies for the monolithic integration of tapers with III-V semiconductor devices," IEEE J. Select. Topics Quantum Electron., vol. 3, No. 6, pp. 1308-1320, 1997.
Juodawlkis et al., "High-power, low-noise 1.5-um slab-coupled optical waveguide (SCOW) emitters: physics, devices, and applications," IEEE J. Sel. Top. Quant. Electr., 17, 1698, 2011.
Kobayashi et al., "Silicon photonic hybrid ring-filter external cavity wavelength tunable lasers," JLT, 33, 1241-1246, 2015.

(Continued)

*Primary Examiner* — Sung H Pak
(74) *Attorney, Agent, or Firm* — Patterson + Sheridan, LLP

(57) ABSTRACT

Aspects described herein include an optical waveguide emitter that includes a first optical waveguide and a second optical waveguide that are evanescently coupled and collectively configured to selectively propagate only a first mode of a plurality of optical modes. Each of the first optical waveguide and the second optical waveguide extend through an input waveguide section, a turning waveguide section, and an output waveguide section. One or more of the input waveguide section, the turning waveguide section, and the output waveguide section includes an optically active region. The optical waveguide emitter further includes a refractive index-increasing feature in the turning waveguide section.

20 Claims, 10 Drawing Sheets

(56) References Cited

OTHER PUBLICATIONS

Maximov et al., "High-performance 640-nm-range GaInP-AlGaInP lasers based on the longitudinal photonic bandgap crystal with narrow vertical beam divergence," IEEE J. Quant. Electr., 41, 1341, 2005.
Menon et al., "Photonic Integration Using Asymmetric Twin-Waveguide (ATG) Technology: Part II—Devices," IEEE J. Sel. Top. Quant. Electr., 11, 30, 2005.
Miah et al., "Astigmatism-free high-brightness 1060 nm edge-emitting lasers with narrow circular beam profile," Opt. Exp., 24, 30514, 2016.
O'Brien et al., "Operating characteristics of a high-power monolithically integrated flared amplifier master oscillator power amplifier," IEEE Journal of Quantum Electronics, 29, 2052-2057, 1993.
Pietrzak et al., "Combination of low-index quantum barrier and super large optical cavity designs for ultranarrow vertical far-fields from high-power broad area lasers," IEEE J. Sel. Top. Quant. Electr., 17, 1715, 2011.
Qiu et al., "Design and fabrication of low beam divergence and high kink-free power lasers," IEEE J. Quant. Electr., 41, 1124, 2005.
U.S. Appl. No. 16/294,634, "Supermode Filtering Waveguide Emitters," filed Mar. 6, 2019.
U.S. Appl. No. 16/366,756,"Variable-Confinement Monolithic Master Oscillator Power Amplifier," filed Mar. 27, 2019.
Wenzel et al., "10 W continuous-wave monolithically integrated master-oscillator power-amplifier," Electronics Letters, 43, 160-161, 2007.
Xia et al., "Photonic Integration Using Asymmetric Twin-Waveguide (ATG) Technology: Part I—Concepts and Theory," IEEE J. Sel. Top. Quant. Electr., 11, 17, 2005.
Zhao et al., "High Power Indium Phosphide Photonic Integrated Circuits," IEEE, 11 Pages.
O'Brien et al., "Operating characteristics of a high-power monolithically integrated flared amplifier master oscillator power amplifier," IEEE JQE, 29, 2052-2057, 1993.
Wenzel et al., "10 W continuous-wave monolithically integrated master-oscillator power-amplifier," Electron. Lett., 43, 160-161, 2007.
U.S. Appl. No. 16/581,923 "Variable Confinement Hybrid Oscillator Power Amplifier," filed Sep. 25, 2019.
Nikita Yu. Gordeev, Alexey S. Payusov, Yuri M. Shemyakov, Sergey A. Mintairov, Nikolay A. Kalyuzhnyy, Marina M. Kulagina, and Mikhail V. Maximov, "Transverse single-mode edge-emitting lasers based on coupled waveguides," Optics Letters, vol. 40, Issue 9, pp. 2150-2152 (2015).
PCT Notification of Transmittal of the International Search Report and the Written Opinion of the International Searching Authority, or the Declaration for Application No. PCT/US2020/024716 dated Jul. 10, 2020.
Amnon Yariv et al., "Supermode Si/III-V hybrid lasers, optical amplifiers and modulators: A Proposal and Analysis," Optics Express, vol. 15, No. 15, Jul. 11, 2007, pp. 9147-5273.
Kasper van Gasse et al, "27 dB gain III-V-on-Silicon Semi-Conductor optical amplifier with > 17 dBm Output Power," Optics Express, vol. 27, No. 1, Jan. 4, 2019, p. 293.
PCT International Search Report for Application No. PCT/US2020/020372 dated May 26, 2020.
U.S. Appl. No. 16/751,994 "Optical Waveguide Emitter With Turning Waveguide Section," filed Jan. 24, 2020
Kasper et al., Packaged hybrid III-V/silicon SOA, ECOC (2014) [Abstract Only].
Zhang et al., Quantum dot SOA/silicon external cavity multi-wavelength laser, Opt. Exp., 23, 4666 (2015).
Zilkie et al., Power-efficient III-V/Silicon external cavity DBR lasers, Opt. Exp., 20, 23456 (2012).
Klamkin et al., High-output saturation power variable confinement slab-coupled optical waveguide amplifier, OFC/NFOEC, Los Angeles, CA (2011). [Abstract Only].
Tohmori et al., Spot-size converted 1.3 um laser with butt-jointed selectively grown vertically tapered waveguide, Electron. Lett., 31, 1069 (1995). [Abstract Only].
Budd et al., Semiconductor optical amplifier (SOA) packaging for scalable and gain-integrated silicon photonic switching platforms, ECTC, San Diego, CA (2015). [Abstract Only].
Tuorila et al., Low loss GaInNaAs/GaAs gain waveguides with U-bend geometry for single-facet coupling in hybrid photonic integration, Appl. Phys. Lett., 113, 041104 (2018). [Abstract Only].

\* cited by examiner

OPTICAL WAVEGUIDE EMITTER WITH TURNING WAVEGUIDE SECTION

CROSS-REFERENCE TO RELATED APPLICATIONS

This application is related to the following U.S. patent applications: Ser. No. 16/290,698 filed Mar. 1, 2019, and Ser. No. 16/294,634 filed Mar. 6, 2019. Each of the related patent applications is herein incorporated by reference in its entirety.

TECHNICAL FIELD

Embodiments presented in this disclosure generally relate to optical waveguide emitters formed from two or more evanescently coupled waveguides, and more specifically, to optical waveguide emitters capable of filtering out unwanted optical modes through lateral radiation.

BACKGROUND

Coherent modulation formats are of primary interest for long-haul and metro applications, and are gaining increased attention for shorter-reach and data center interconnect (DCI) applications. However, coherent modulators in silicon tend to be high-loss due to modulating both phase and amplitude. For upcoming 600 GB, 800 GB, and 1 TB applications, the transmitter insertion loss of the coherent modulators is estimated at 25-29 dB. Meanwhile, the required transmitter output power into the optical fiber is between 0 and +3 dBm.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
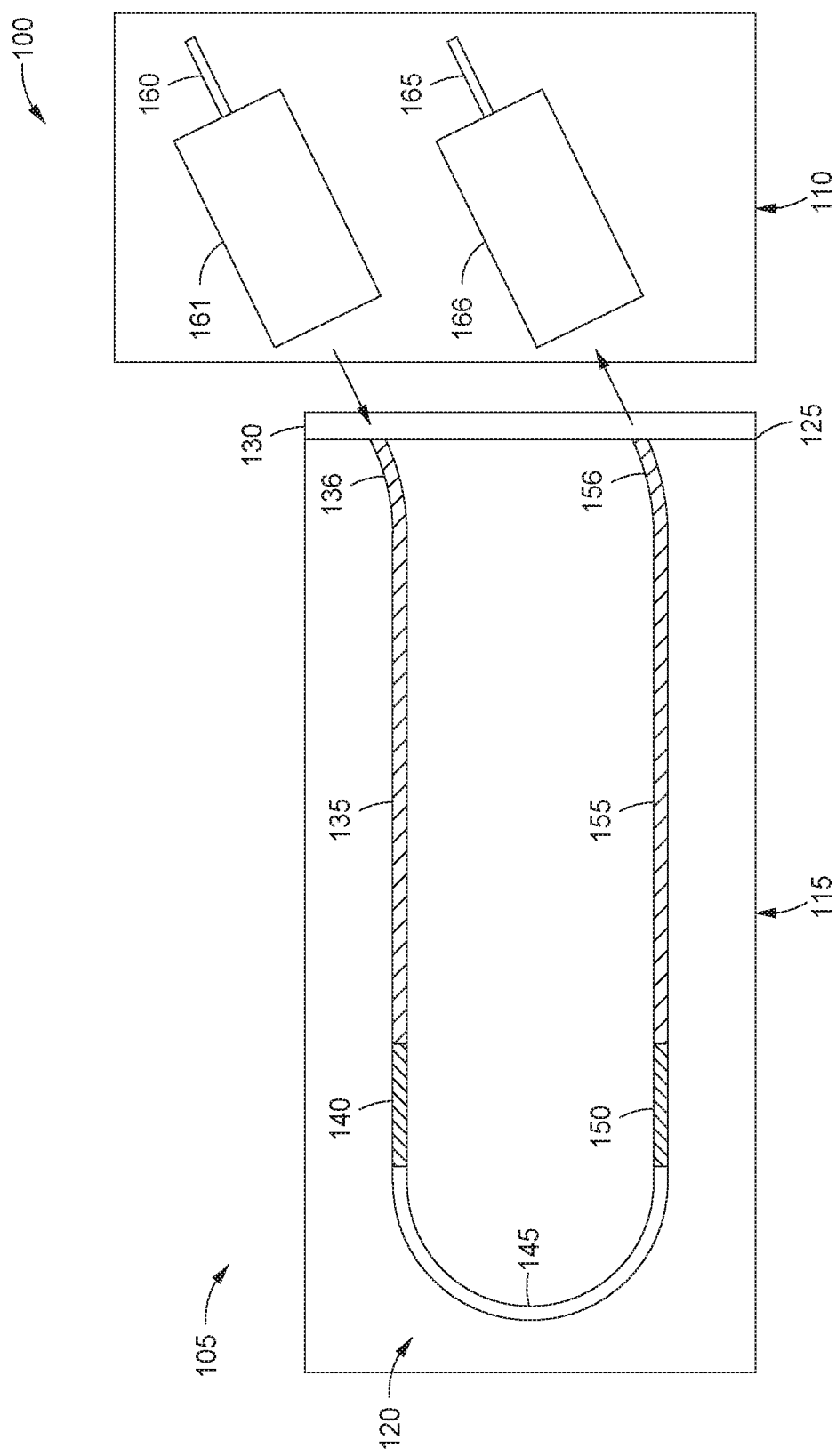
FIG. 1 is a top view of an optical system comprising a variable-confinement optical waveguide emitter, according to one or more embodiments.

One embodiment presented in this disclosure is an optical waveguide emitter comprising a first optical waveguide and a second optical waveguide that are evanescently coupled and collectively configured to selectively propagate only a first mode of a plurality of optical modes. Each of the first optical waveguide and the second optical waveguide extend through an input waveguide section, a turning waveguide section, and an output waveguide section. One or more of the input waveguide section, the turning waveguide section, and the output waveguide section comprises an optically active region. The optical waveguide emitter further comprises a refractive index-increasing feature in the turning waveguide section.

Another embodiment presented in this disclosure is an optical system comprising a photonic chip comprising an optical component having a predefined height relative to a first surface of the photonic chip, a semiconductor substrate having a second surface, and an optical waveguide emitter contacting the second surface. The optical waveguide emitter comprises a first optical waveguide and a second optical waveguide that are evanescently coupled and collectively configured to selectively propagate only a first mode of a plurality of optical modes. Each of the first optical waveguide and the second optical waveguide extend through an input waveguide section, a turning waveguide section, and an output waveguide section. One or more of the input waveguide section, the turning waveguide section, and the output waveguide section comprises an optically active region. The optical waveguide emitter further comprises a refractive index-increasing feature in the turning waveguide section. When the second surface contacts the first surface, one of the first optical waveguide and the second optical waveguide is optically aligned with the optical component in at least one dimension.

Example Embodiments

To meet the required transmitter output power mentioned above, an Integrated Tunable Laser Assembly (ITLA) would typically need to achieve +25 to 30 dBm output, or up to 1 Watt. Such an implementation of a laser may be prohibitive from cost and/or power consumption viewpoints. Currently, tunable lasers are only available with +18 dBm output power.

An inline amplifier (e.g., micro erbium-doped fiber amplifier (EDFA)) can be used to relax the required input power from the laser. However, adding the inline amplifier tends to introduce excess noise into the modulated signal, which can significantly reduce transmission distance. As modulation format complexity increases, higher output optical signal-to-noise ratio (OSNR) is desired. For 1 TB optical links, greater than 45 dB OSNR is desired. Thus, no more than 3-4 dB of gain may be achievable due to noise introduced by the inline amplifier.

Several additional challenges may be encountered with integrating laser sources and other optically active components with a semiconductor-based photonic chip. For example, an efficient coupling of light between the laser source and the photonic chip can require a complex and costly optical alignment process. To support higher data rates (e.g., through faster modulation and/or more optical channels), the laser source may be scaled to higher power levels. In some cases, additional optical components such as lenses and isolators may be needed to protect against optical feedback. In some cases, it may be necessary to attach a laser source to a submount before integrating with the photonic chip, which increases fabrication costs and reduces overall fabrication yields.

According to embodiments discussed herein, an optical waveguide emitter comprises a first optical waveguide and a second optical waveguide that are evanescently coupled and collectively configured to selectively propagate only a first mode of a plurality of optical modes. Each of the first optical waveguide and the second optical waveguide extend through an input waveguide section, a turning waveguide section, and an output waveguide section. One or more of the input waveguide section, the turning waveguide section, and the output waveguide section comprises an optically active region. The optical waveguide emitter further comprises a refractive index-increasing feature in the turning waveguide section.

Beneficially, the optical waveguide emitter may be more readily integrated with a semiconductor-based photonic chip. The optical waveguide emitter provides an improved coupling efficiency due to a large mode size. Further, the optical waveguide emitter is scalable to higher optical powers due to the large mode size, as well as low intrinsic losses and a low optical confinement factor of the optical waveguide emitter. The optical waveguide emitter enables a large optical waveguide supporting propagation of a single optical mode. In some cases, the shape of the optical mode may be controlled through a selected material stack-up of the optical waveguide emitter. In some cases, the size of the optical mode may be controlled by varying a width of a ridge of the optical waveguide emitter.

Further, in some embodiments, the optical waveguide emitter includes a spacer layer between the first optical waveguide and the second optical waveguide. The spacer layer may operate as an etch stop layer, which can simplify the fabrication process and reduce costs of producing the optical apparatus. Still further, the optical waveguide emitter may be integrated directly with a silicon substrate, eliminating a requirement for a separate submount. The silicon substrate offers additional features, such as through-silicon vias (TSVs), precise mechanical features using, e.g., photolithography and wet etching, a high thermal conductivity, a matched coefficient of thermal expansion (CTE) with the photonic chip. Additionally, use of the silicon substrate enables wafer-scale processing, test, and burn-in. Although specifically discussed in terms of a silicon substrate, other implementations are also possible. For example, the optical waveguide emitter may be grown on an indium phosphide (InP) substrate, and then soldered to an aluminum nitride carrier and packaged in a hermetically sealed "gold box".

FIG. 1 is a top view of an optical system 100 comprising a variable-confinement optical waveguide emitter 120 (also referred to as optical waveguide emitter 120), according to one or more embodiments. Generally, the optical waveguide emitter 120 comprises an optical waveguide arrangement comprising a first optical waveguide and a second optical waveguide that are evanescently coupled (e.g., spaced apart from each other by a spacer layer) and configured to selectively propagate only a first mode of a plurality of optical modes of an optical signal. The optical waveguide emitter 120 further comprises an optically active region that provides amplification to an optical signal propagating through the optical waveguide emitter 120. In some embodiments, the optical waveguide emitter 120 comprises a semiconductor laser or a semiconductor optical amplifier (SOA), although other implementations of the optical waveguide emitter 120 are also possible.

The optical system 100 comprises an optical apparatus 105 that is optically coupled with a photonic chip 110. The optical apparatus 105 comprises a semiconductor substrate 115, from which various optical and electrical components may be grown, patterned, etched, deposited, or eutectically bonded. In some embodiments, the semiconductor substrate 115 comprises a bulk silicon (Si) substrate, although other semiconductor materials are also contemplated. In some embodiments, the thickness of the semiconductor substrate 115 is between about 0.3 millimeters (mm) and about 1 mm. However, dimensions of the semiconductor substrate 115 may differ to account for new diameters and/or thicknesses desired in Si (or other semiconductor material) fabrication industries.

One or more features and/or materials of the optical waveguide emitter 120 are pre-processed in the semiconductor substrate 115. As shown, the optical waveguide emitter 120 comprises an input waveguide section 135, a first transition waveguide section 140, a turning waveguide section 145, a second transition waveguide section 150, and an output waveguide section 155.

The input waveguide section 135 extends from a facet 125 of the semiconductor substrate 115. The input waveguide section 135 receives an optical signal at an input port 136 arranged at the facet 125, and propagates the optical signal along a length of the input waveguide section 135. The first transition waveguide section 140 extends between the input waveguide section 135 and the turning waveguide section 145.

In some embodiments, the turning waveguide section 145 has a greater optical confinement than the input waveguide section 135. Beneficially, the turning waveguide section 145 having a greater optical confinement may be implemented with a smaller bend radius, providing a lower optical loss through the turning waveguide section 145 and supporting a reduced overall size of the optical waveguide emitter 120. In one embodiment, the turning waveguide section 145 has a greater optical confinement along one dimension. In another embodiment, the turning waveguide section 145 has a greater optical confinement along two dimensions. The turning waveguide section 145 is depicted as a continuous curve that is U-shaped, although other arrangements are also contemplated. For example, the turning waveguide 145 section may include one or more straight waveguide segments and one or more turning mirrors, as depicted in FIG. 11 of U.S. Ser. No. 16/290,698 (which is herein incorporated by reference in its entirety). In some embodiments, the turning waveguide section 145 has a bend radius between 25 microns and 1000 microns. In some embodiments, the turning waveguide section 145 has a bend radius between about 50 microns and 500 microns.

In some embodiments, the turning waveguide section 145 comprises at least one refractive index-increasing feature, which further increases the optical confinement of the turning waveguide section 145. For example, the turning waveguide section 145 may comprise a mode-pulling layer and/or a reduced dimensioning of a first optical waveguide of the optical waveguide emitter 120, which tends to direct the mode of an optical signal away from the first optical waveguide into a second optical waveguide of the optical waveguide emitter 120. In some embodiments, the first optical waveguide is arranged in a base portion of the optical waveguide emitter 120, and the second optical waveguide is arranged in a ridge portion of the optical waveguide emitter 120.

The first transition waveguide section 140 extends between the input waveguide section 135 and the turning waveguide section 145. The first transition waveguide section 140 gradually changes the optical confinement of a propagating optical signal (e.g., a size of the optical mode) along one or more dimensions, through a gradual increase or decrease of one or more material layers proximate to at least one optical waveguide. In some embodiments, the one or more material layers provide a greater average refractive index than that of the optical waveguide(s), such that the optical mode is more confined for an increase of the one or more material layers, and the optical mode is less confined for a decrease of the one or more material layers.

In one example, the increase of the one or more material layers of the first transition waveguide section 140 comprises an increased number of material layers, and changing the optical confinement is accomplished through gradually decreasing the number of material layers. In another example, the increase of the one or more material layers comprises an increased dimensioning of the one or more material layers, and changing the optical confinement is accomplished through decreasing the dimensioning (e.g., tapering the one or more material layers) in one or more dimensions. Thus, in the optical waveguide emitter 120, the one or more material layers of the first transition waveguide section 140 gradually increase along a direction of propagation of the optical signal (from the input waveguide section 135 to the turning waveguide section 145) to increase the optical confinement.

The second transition waveguide section 150 extends between the turning waveguide section 145 and the output waveguide section 155. The second transition waveguide section 150 gradually changes the optical confinement of a propagating optical signal (e.g., a size of the optical mode) along one or more dimensions, through a gradual increase or decrease of one or more material layers proximate to at least one optical waveguide. In some embodiments, the one or more material layers provide a greater average refractive index than that of the optical waveguide(s), such that the optical mode is more confined for an increase of the one or more material layers, and the optical mode is less confined for a decrease of the one or more material layers. In the optical waveguide emitter 120, the one or more material layers of the second transition waveguide section 150 gradually decrease along a direction of propagation of the optical signal (from the turning waveguide section 145 to the output waveguide section 155) to decrease the optical confinement.

The output waveguide section 155 extends to the same facet 125 of the semiconductor substrate 115. The optical signal when propagated through the output waveguide section 155 exits through an output port 156 arranged at the facet 125. In some embodiments, the input waveguide section 135 and/or the output waveguide section 155 have a lesser optical confinement than the turning waveguide section 145, such that the optical waveguide emitter 120 receives and/or provides a relatively large-sized optical mode. In an alternate embodiment, the input waveguide section 135 and the output waveguide section 155 extend to different facets, which may be arranged along a same side or along different sides of the semiconductor substrate 115.

As mentioned above, one or more of the input waveguide section 135, the first transition waveguide section 140, the turning waveguide section 145, the second transition waveguide section 150, and the output waveguide section 155 comprises an optically active region. Thus, the optical waveguide emitter 120 comprises one or more optically active regions to provide an amplified optical signal at the output port 156. In cases where the optical waveguide emitter 120 comprises a plurality of optically active regions, the plurality of optically active regions of may be of a same type or of different types (e.g., providing different optical power levels or optical gain levels). In some embodiments, each of the one or more optically active regions comprises one or more of quantum wells, quantum dots, and quantum wires. However, other types of optically active materials are also contemplated. Further, the one or more optically active regions may be electrically pumped and/or optically pumped. Some examples of alternate configurations of the optical waveguide emitter 120 are depicted in FIGS. 7-11 of U.S. Ser. No. 16/290,698.

The photonic chip 110 and/or the optical waveguide emitter 120 may have a suitable configuration to mitigate back reflections when transmitting optical signals between the photonic chip 110 and the optical waveguide emitter 120. In some embodiments, the photonic chip 110 has an edge-coupled structure with an output port and an input port that are arranged to align with the input port 136 and the output port 156 of the optical waveguide emitter 120. In some embodiments, one or both of the input port 136 and the output port 156 are angled relative to a long axis of the input waveguide section 135 and/or the output waveguide section 155. For example, the long axis of the input waveguide section 135 and/or the output waveguide section 155 may be substantially orthogonal to the facet 125, and the input port 136 and/or the output port 156 may be non-orthogonal to the facet 125. In some embodiments, the angle of the input port 136 and the output port 156 have a same angling relative to the facet 125. In some embodiments, an antireflective coating 130 may be applied to the facet 125 to (further) mitigate back reflections. Some non-limiting examples of the antireflective coating 130 include one or more layers of aluminum oxide ($Al_2O_3$), titanium dioxide ($TiO_2$), silicon dioxide ($SiO_2$), silicon nitride (SiN), magnesium fluoride ($MgF_2$), tantalum pentoxide ($Ta_2O_5$), etc. deposited at the facet 125.

The photonic chip 110 comprises a first waveguide 160 (e.g., a sub-micron waveguide), a first spot size converter 161, a second waveguide 165 (e.g., a sub-micron waveguide), and a second spot size converter 166. Although not shown, the first waveguide 160 may be optically coupled with an optical source, such as an integrable tunable laser assembly (ITLA) that transmits a continuous wave (CW) optical signal (e.g., an unmodulated optical signal) through the first waveguide 160. Other types of optical sources and/or optical signals are also contemplated. In some embodiments, the output power provided by the optical source is insufficient for performing coherent modulation, and the optical waveguide emitter 120 provides an amplified optical signal from the output port 156 that has an output power sufficient for performing coherent modulation.

In some embodiments, the first waveguide 160 of the photonic chip 110 routes the CW optical signal to the first spot size converter 161. Because the optical mode of the CW optical signal in the first waveguide 160 may be much smaller than the mode size of the waveguide in the input waveguide section 135, the first spot size converter 161 increases the mode size to better match the mode of the waveguide in the input waveguide section 135. As such, the optical coupling efficiency between the photonic chip 110 and the optical waveguide emitter 120 is improved. In one alternate embodiment, the optical mode of the CW optical signal in the first waveguide 160 and/or the second waveguide 165 is similar to the mode size of the waveguide in the input waveguide section 135 and/or the output waveguide section 155, such that the photonic chip 110 need not include the first spot size converter 161 and/or the second spot size converter 166. In another alternate embodiment, the optical mode of the CW optical signal in the first waveguide 160 and/or the second waveguide 165 is greater than the mode size of the waveguide in the input waveguide section 135 and/or the output waveguide section 155, such the first spot size converter 161 may decrease the mode size and/or the second spot size converter 166 may increase the mode size.

Thus, during operation of the optical system 100, after the CW optical signal propagates through the first spot size converter 161, the CW optical signal exits the photonic chip 110 and is received by the optical waveguide emitter 120 at the input port 136. The CW optical signal propagates through the input waveguide section 135 and through the first transition waveguide section 140. After the mode size of the CW optical signal is reduced by the first transition waveguide section 140, the CW optical signal is reoriented as it propagates through the turning waveguide section 145. The mode size of the CW optical signal is increased by the second transition waveguide section 150, and the CW optical signal is propagated along the output waveguide section 155. The now-amplified CW optical signal exits the optical waveguide emitter 120 at the output port 156, and is received by the photonic chip 110 at the second spot size converter 166. The second spot size converter 166 reduces the mode size of the CW optical signal, which is provided to the second waveguide 165.

Thus, in the optical system 100, the optical waveguide emitter 120 provides an optical amplification for optical signals carried on the photonic chip 110 with a relatively simple optical alignment process. The large optical mode supported by the input waveguide section 135 and/or the output waveguide section 155 improves a coupling efficiency and a misalignment tolerance. The integrated mode transition (or conversion) provided by first transition waveguide section 140 and/or the second transition waveguide section 150 allows use of a tightly-confined mode for sharp turns and a large mode for external coupling. The optical system 100 also supports multi-stage amplification with a high-gain, low-power SOA (in the tightly-confined regions) on the same chip as a low-gain, high-power SOA.

Figure 2:
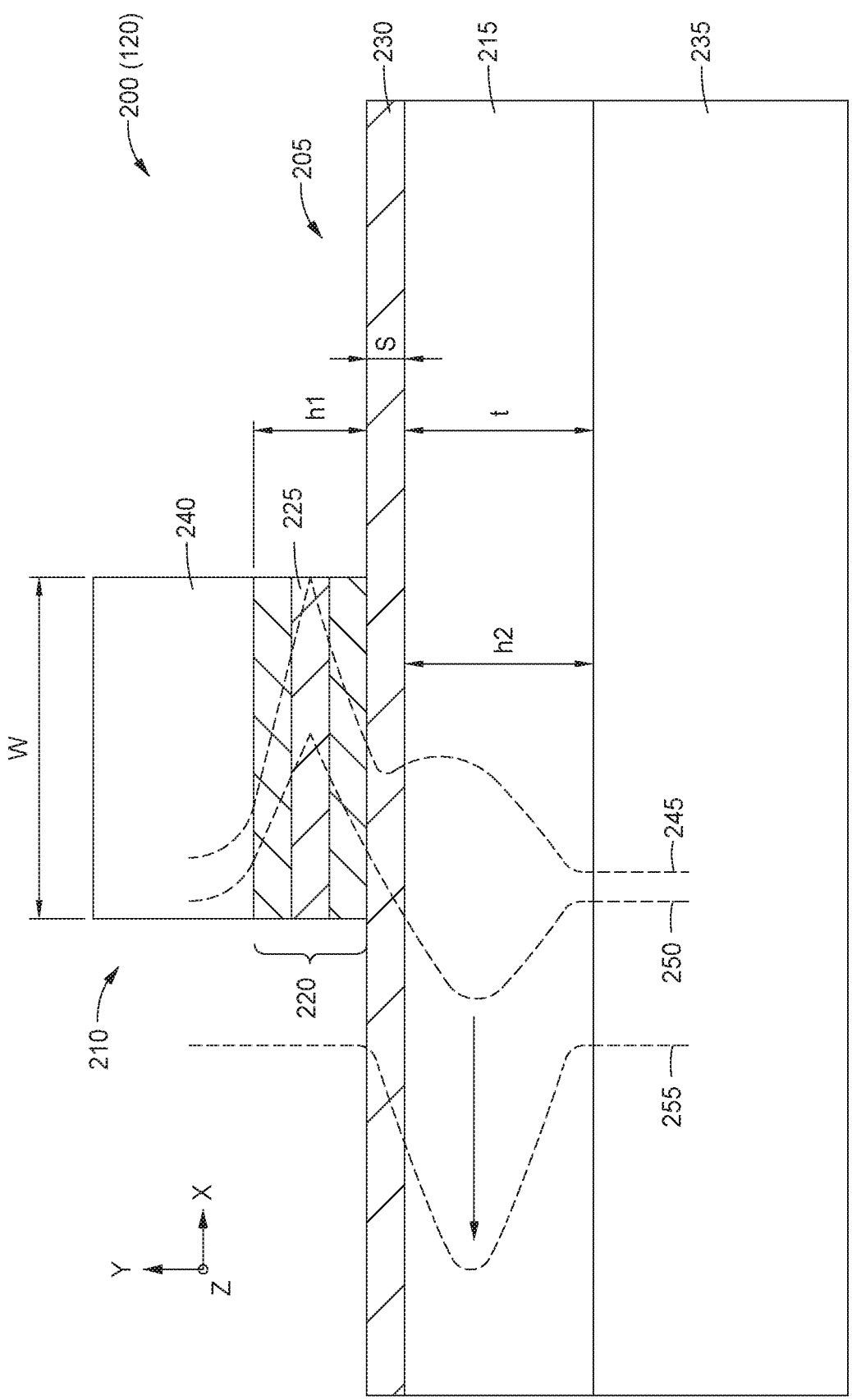
FIG. 2 is a cross-section view of an optical waveguide emitter having an optically active region disposed in a ridge portion, according to one or more embodiments.

FIG. 2 is a cross-section view of an optical waveguide emitter 200 having an optically active region 225 disposed in a ridge portion 210, according to one or more embodiments. The optical waveguide emitter 200 may be used in conjunction with other embodiments, such as being one exemplary implementation of the optical waveguide emitter 120 depicted in FIG. 1.

In the optical waveguide emitter 200, the ridge portion 210 extends from a base portion 205. Generally, the base portion 205 is significantly wider (e.g., along the x-dimension) than the ridge portion 210. The base portion 205 comprises a first optical waveguide 215 arranged above a first cladding layer 235. The first optical waveguide 215 is configured to extend indefinitely (or for a distance much wider than the ridge portion 210) in the lateral dimension (e.g., along the x-dimension). The first optical waveguide 215 may have any suitable implementation.

For example, where the first cladding layer 235 comprises an indium phosphide (InP) semiconductor material, the first optical waveguide 215 may be formed of gallium indium arsenide phosphide (GaInAsP), aluminum gallium indium arsenide (AlGaInAs), or another suitable quaternary compound semiconductor material. In another example, where the first cladding layer 235 comprises an aluminum gallium arsenide (AlGaAs) semiconductor material, the first optical waveguide 215 may be formed of gallium arsenide (GaAs), AlGaAs with a lower proportion of aluminum, and so forth.

The first optical waveguide 215 has a total thickness (t) along the y-dimension. For example, the thickness (t) may be between about 2 and about 10 microns. In some embodiments, and as depicted in FIG. 2, the first optical waveguide 215 comprises a single optical waveguide layer arranged above the first cladding layer 235 and having a height ($h_2$) along the y-dimension. In some embodiments, the height ($h_2$) of the single optical waveguide layer equals the total thickness (t) of the first optical waveguide 215, but this is not a requirement. For example, FIG. 7 of U.S. Ser. No. 16/294,634 (which is herein incorporated by reference in its entirety) depicts an alternate implementation in which the first optical waveguide arranged in the base portion comprises two optical waveguide layers separated by a spacer layer, FIG. 8 depicts an alternate implementation in which the first optical waveguide comprises two optical waveguide layers separated by a quantum dot layer (one example of an optically active region), and FIG. 10 depicts an alternate implementation in which the first optical waveguide has an alternating arrangement of high-index and low-index optical waveguide layers (e.g., a dilute waveguide).

The ridge portion 210 comprises a second optical waveguide 220 that is spaced apart from the first optical waveguide 215, and a second cladding layer 240 that is disposed above the second optical waveguide 220. The second optical waveguide 220 may have any suitable implementation. For example, where the second cladding layer 240 comprises an indium phosphide (InP) semiconductor material, the second optical waveguide 220 may be formed of gallium indium arsenide phosphide (GaInAsP), aluminum gallium indium arsenide (AlGaInAs), or another suitable quaternary compound semiconductor material. In another example, where the second cladding layer 240 comprises an aluminum gallium arsenide (AlGaAs) semiconductor material, the second optical waveguide 220 may be formed of gallium arsenide (GaAs), AlGaAs with a lower proportion of aluminum, and so forth. In some embodiments, the second optical waveguide 220 is implemented with a same material as the first optical waveguide 215, but this is not a requirement.

In some embodiments, and as shown in the optical waveguide emitter 200, an optically active region 225 is disposed in the second optical waveguide 220. In alternate embodiments, the optically active region 225 may be disposed in the first optical waveguide 215. Any suitable optical gain material(s) may be used in the optically active region 225, such as quantum wells, quantum dots, quantum wires, etc., which may be electrically pumped and/or optically pumped.

The first optical waveguide 215 and the second optical waveguide 220 are spaced apart by a spacer layer 230, and form an evanescently coupled waveguide arrangement. As shown, the first optical waveguide 215 and the second optical waveguide 220 are "vertically stacked", although other relative arrangements are also possible. As such, the effective refractive indices of the modes of the independent first optical waveguide 215 and the second optical waveguide 220 should be appropriately chosen to create a desired supermode that is selectively propagated by the optical waveguide emitter 200. The effective refractive indices can be varied by changing a geometry of the first optical waveguide 215 and/or the second optical waveguide 220 (e.g., changing a width and/or a thickness) or materials (bulk refractive indices). The materials and thickness of the spacer layer 230 also may be chosen to affect the supermode properties. The arrangement of the first waveguide 215 and the second waveguide 220 can (and generally will) support a plurality of supermodes. However, by virtue of the design of the optical waveguide emitter 200, a fundamental supermode is confined in the ridge portion 210, and all of the other (unwanted) supermodes are filtered out by radiating into the lateral extent of the first optical waveguide 215. Thus, a single mode may be selectively propagated by the optical waveguide emitter 200.

In some embodiments, the second optical waveguide 220 is formed as a first waveguide stratum that is doped with a first conductivity type, and a second waveguide stratum that is doped with a different, second conductivity type. The optically active region 225 is disposed in the second optical waveguide 220 between the first waveguide stratum and the second waveguide stratum. In such cases, the first optical waveguide 215 may have any suitable doping or may be undoped.

In some embodiments, the second optical waveguide 220 is formed from a III-V semiconductor material or alloy, and has a thickness between about 0.3 and about 3 microns. In some embodiments, a width of the ridge portion 210 (w) along the x-dimension is between about 1 and about 10 microns. With such dimensioning, a diameter of the optical mode may be about 4 and about 5 microns, which is much larger than most semiconductor optical amplifiers (SOAs) that support single mode amplification. As the mode size increases, the optical signal typically has multiple modes. However, the optical waveguide emitter 200 can have a large mode size and still support single mode amplification because the first optical waveguide 215 effectively filters out the additional modes by radiating the additional modes away from the ridge portion 210.

The spacer layer 230 is disposed between the first optical waveguide 215 and the second optical waveguide 220. The spacer layer 230 may have any suitable implementation, such as InP or a suitable quaternary compound semiconductor material. Further, the spacer layer 230 may have any suitable doping or may be undoped. The spacer layer 230 has a height (s) along the y-dimension.

The first optical waveguide 215, the second optical waveguide 220, and/or the spacer layer 230 are dimensioned and arranged such that the first optical waveguide 215 and the second optical waveguide 220 are evanescently coupled. Through the evanescent coupling, the combination of the first optical waveguide 215 and the second optical waveguide 220 are configured to propagate a coupled supermode representing a sum of the modes of the first optical waveguide 215 and the second optical waveguide 220.

In some embodiments, the second optical waveguide 220 is configured to propagate a plurality of optical modes (illustrated as effective index plots 245, 250, 255), and the first optical waveguide 215 is configured to selectively propagate a first mode of the plurality of optical modes. Described another way, a fundamental coupled mode (e.g., an in-phase optical mode, illustrated by the effective index plot 245) has an effective index that is greater than that of the first optical waveguide 215, and higher-order coupled modes (e.g., out-of-phase optical modes, illustrated by the effective index plots 250, 255) have effective indexes that are less than that of the first optical waveguide 215. Thus, the fundamental coupled mode is confined by the first optical waveguide 215, while the higher-order coupled modes are radiated away by the first optical waveguide 215.

According to the coupled mode theory for evanescently coupled waveguides, the coupled system of two waveguides supports two supermodes (an in-phase mode and an out-of-phase mode) whose field profiles are approximately described by the superposition of the individual waveguide modes. The effective indices of these modes can be described by the equations $n_{eff}^{+}=[\Delta n^2+K^2]^{1/2}$ (in-phase) and $n_{eff}^{-}=n-[\Delta n^2+K^2]^{1/2}$ (out-of-phase), where n is the effective indices of the two waveguides averaged, $\Delta n$ is the half the difference of the two waveguides' effective indices, and K is related to the coupling strength between the two waveguides. For the optical waveguide emitter 200 in the region where the second optical waveguide 220 is etched away, the mode effective index is approximately equal to the effective index of the first optical waveguide 215 alone, which is expressed as $n_{eff}^{I}=n+/-\Delta n$ (sign depending on how the difference between waveguide effective indices is taken). It is apparent that $n_{eff}^{+}>n_{eff}^{I}>n_{eff}^{-}$ for $K^2>0$. Since in general a mode is pulled into the region with a higher refractive index, it follows that the in-phase mode is confined in the ridge portion 210, whereas the out-of-phase mode is pulled into the lateral region (where the second optical waveguide 220 is etched away) where it radiates away from the ridge portion 210 and the optical power is lost. By this principle, the desired in-phase mode is confined to the ridge portion 210, while the unwanted out-of-phase supermode is filtered out by radiating away.

Figure 3:
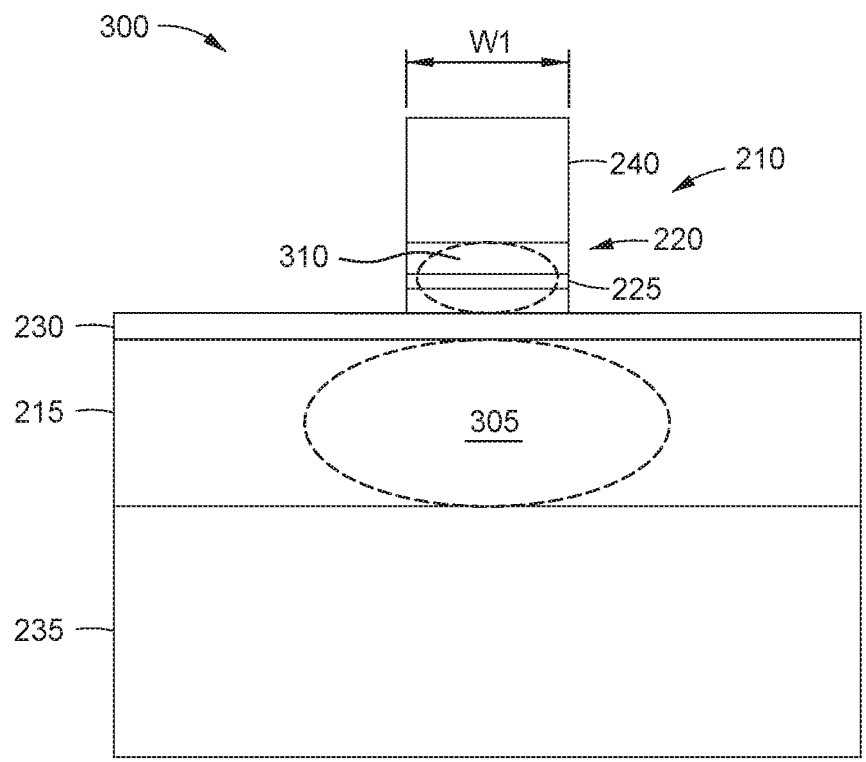
FIGS. 3 and 4 illustrate altering the confinement of an optical mode, according to one or more embodiments.
Figure 4:
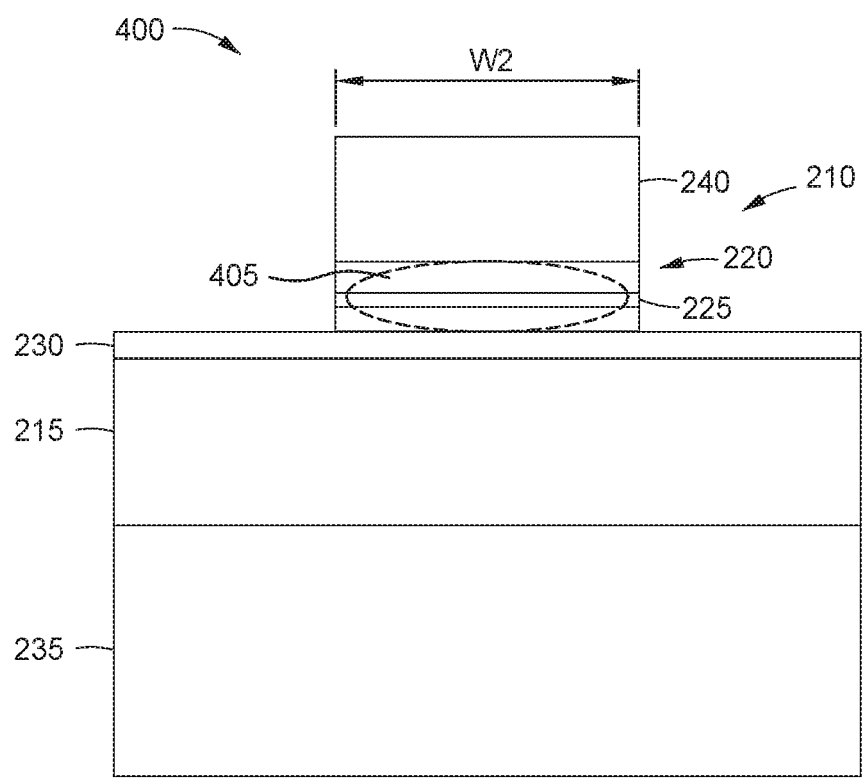

FIGS. 3 and 4 illustrate altering the confinement of an optical mode, according to one or more embodiments. The features illustrated in diagrams 300, 400 may be used in conjunction with other embodiments, such as with the optical waveguide emitter 200 of FIG. 2. More specifically, the diagram 300 represents a first cross-section view of the optical waveguide emitter having first optical confinement characteristics, and the diagram 400 represents a second cross-section view of the optical waveguide emitter having second optical confinement characteristics.

In the diagram 300, the ridge portion 210 and the second optical waveguide 220 have a width W1 along the x-dimension. In the diagram 400, the ridge portion 210 and the second optical waveguide 220 have a width W2 that is greater than width W1. The ridge portion 210 having the width W1 causes the optical waveguide emitter to have a relatively lesser confinement in the second optical waveguide 220 (compared to the width W2), such that the optical mode propagates through the first optical waveguide 215 (as a first optical mode portion 305) and through the second optical waveguide 220 (as a second optical mode portion 310) in the diagram 300. The ridge portion 210 having the width W2 causes the optical waveguide emitter to have a relatively greater confinement in the second optical waveguide 220, such that the optical mode 405 propagates primarily in the second optical waveguide 220 in the diagram 400.

In this way, the second optical waveguide 220 may have different widths along a length of the ridge portion 210 (as shown in the diagrams 300, 400, along a dimension extending into and out of the page). Thus, by adjusting the width of the ridge portion 210 and the second waveguide 220 through a transition section, the optical waveguide emitter may be used to provide a variable confinement SOA, e.g., where high optical gain is required in one region and high optical power is required in another region. Additionally, by adjusting the width of the ridge portion 210 and the second waveguide 220, the optical waveguide emitter may be used to provide an optical apparatus with a large optical mode at an external interface and small optical mode in the bulk of the optical apparatus.

Although altering the confinement of an optical mode has been described above in terms of adjusting the width of the second waveguide 220 to transition the optical confinement of the optical waveguide emitter along one dimension (i.e., the vertical dimension), in various embodiments described herein, the optical waveguide emitter may be dimensioned to transition the optical confinement along the one dimension using other features in addition to adjusting the width of the second waveguide 220, and/or may be dimensioned to transition the optical confinement along one or more other dimensions. For example, the optical waveguide emitter may comprise one or more refractive index-increasing features in the turning waveguide section of the optical waveguide emitter, enabling the turning waveguide section to have a greater optical confinement. As such, the turning waveguide section may be implemented with a smaller bend radius, providing a lower optical loss through the turning waveguide section as well as supporting a reduced overall size of the optical waveguide emitter.

Figure 5:
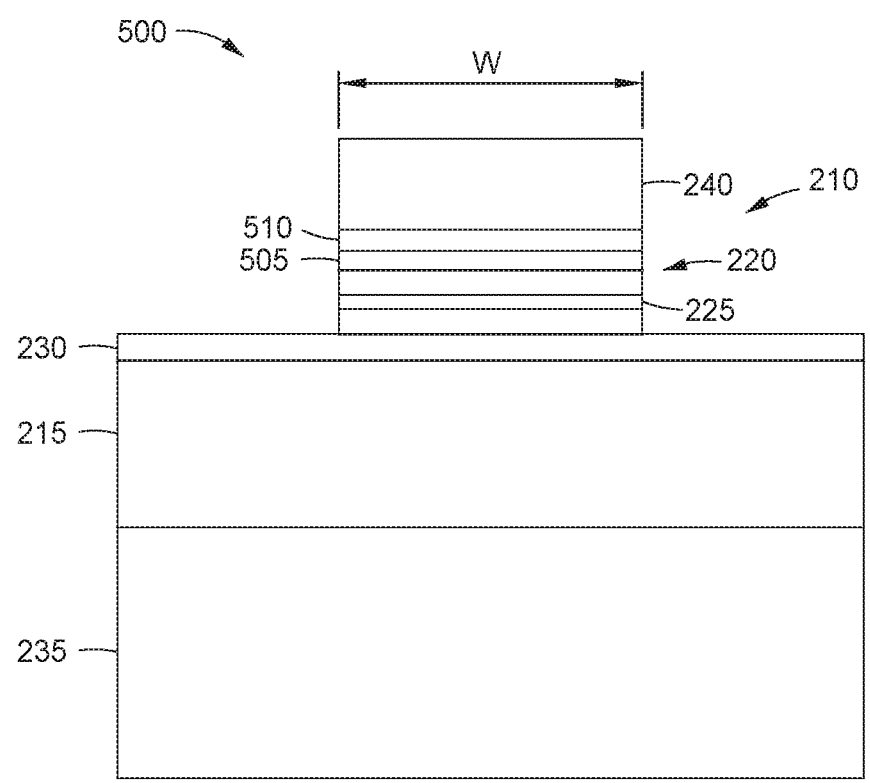
FIG. 5 is a diagram illustrating a mode-pulling layer arranged in a ridge portion, according to one or more embodiments.

FIG. 5 is a diagram 500 illustrating a mode-pulling layer 510 arranged in the ridge portion 210, according to one or more embodiments. More specifically, the diagram 500 provides a cross-section view of an optical waveguide emitter. The mode-pulling layer 510 represents one example of a refractive index-increasing feature that may be implemented in an optical waveguide emitter, e.g., in the turning waveguide section 145 depicted in FIG. 1.

The mode-pulling layer 510 is arranged in the ridge portion 210 above the second optical waveguide 220, and the second cladding layer 240 is arranged above the mode-pulling layer 510. The mode-pulling layer 510 comprises one or more layers of material(s) having a higher refractive index than the second optical waveguide 220. In this way, the mode-pulling layer 510 provides a greater optical confinement of a propagating optical signal. In some embodiments, the mode-pulling layer 510 comprises a same semiconductor material as the second optical waveguide 220. In other embodiments, the mode-pulling layer 510 comprises a quaternary compound semiconductor material that is different than that of the second optical waveguide 220.

As shown, the mode-pulling layer 510 is spaced apart from the second optical waveguide 220 by a spacer layer 505. In other embodiments, mode-pulling layer 510 contacts the second optical waveguide 220. The spacer layer 505 may have any suitable material and dimensioning, e.g., an InP spacer layer with a thickness between about 10 and about 500 nanometers. In some embodiments, the thickness is about 100 nanometers.

Although the mode-pulling layer 510 is shown as being arranged above the optically active region 225, alternate implementations of the optical waveguide emitter may have the mode-pulling layer 510 arranged below the optically active region 225, the mode-pulling layer 510 "replacing" the optically active region 225 in a passive section of the optical waveguide emitter, and so forth. Further, although the mode-pulling layer 510 is shown as being arranged above the second optical waveguide 220, alternate implementations of the optical waveguide emitter may have the mode-pulling layer 510 arranged below or within the second optical waveguide 220.

The ridge portion 210 may be formed using a single etch process to have a width w. In this way, the mode-pulling layer 510 and the second optical waveguide 220 may have the width w.

Figure 6:
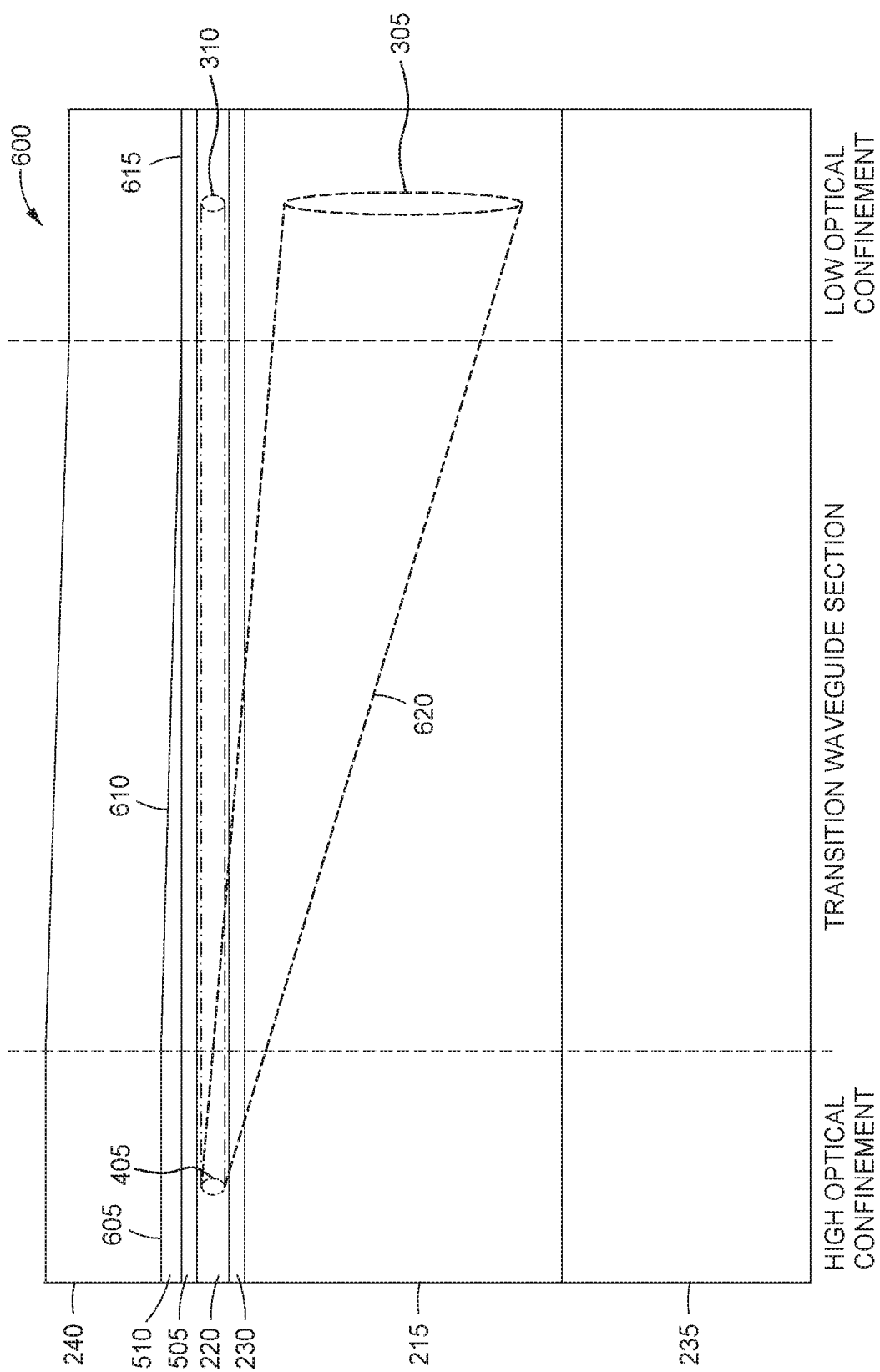
FIG. 6 is a diagram illustrating an exemplary optical waveguide emitter, according to one or more embodiments.

FIG. 6 is a diagram 600 illustrating an exemplary optical waveguide emitter, according to one or more embodiments. More specifically, the diagram 600 provides a side view of the optical waveguide emitter. The features depicted in the diagram 600 may be used in conjunction with other embodiments described herein. For example, the optical waveguide emitter depicted in the diagram 600 may correspond to the cross-section view shown in the diagram 500 of FIG. 5.

In the diagram 600, the high optical confinement section and at least a portion of the transition waveguide section may correspond to the turning waveguide section 145 of FIG. 1. In some embodiments, the entire transition waveguide section is included in the turning waveguide section 145. In other embodiments, a first portion of the transition waveguide section is included in the turning waveguide section, and a second portion of the transition waveguide section extends into, e.g., the first transition waveguide section 140 or the second transition waveguide section 150 of FIG. 1.

In the diagram 600, the mode-pulling layer 510 comprises a first region 605 having a substantially constant height, and a second region 610 having a gradually increasing (or decreasing) height. The first region 605 corresponds to the region of high optical confinement (e.g., the optical mode 405), and the second region 610 corresponds to a region of transitioning optical confinement (e.g., a transitioning optical mode 620 between a low optical confinement and a high optical confinement). In some embodiments, within the second region 410, the one or more layers included in the mode-pulling layer 510 provide a tapering in one or more dimensions to provide an increased optical confinement. In a third region 615, the height of the mode-pulling layer 510 may be zero, providing a region of low optical confinement (e.g., the optical mode includes the first optical mode portion 305 propagated through the second optical waveguide 220 and the second optical mode portion 310 propagated through the first optical waveguide 215).

The mode-pulling layer 510 may have any suitable shape in the second region 610 to provide a desired transition of the optical confinement. For example, the mode-pulling layer 510 may change continuously or non-continuously in the second region 610. In some embodiments, the mode-pulling layer 510 changes linearly in the second region 610. In other embodiments, the mode-pulling layer 510 changes non-linearly in the second region 610.

In one embodiment, the mode-pulling layer 510 comprises a single material layer, and the tapering of the mode-pulling layer 510 is achieved through variable-rate selective area growth of the single material layer. In another embodiment, the mode-pulling layer 510 comprises a plurality of material layers, and the tapering of the mode-pulling layer 510 is achieved through decreasing the number of material layers. Such an embodiment is illustrated in FIG. 5 of U.S. Ser. No. 16/290,698, where a plurality of material layers provide a stepped tapering of the mode-pulling layer 510 in the second region 610.

The diagram 600 illustrates a transitioning of the optical confinement along one dimension (i.e., the vertical dimension). Additionally or alternately, the mode-pulling layer 510 may provide a transitioning of the optical confinement along one or more other dimensions. For example, FIG. 6 of U.S. Ser. No. 16/290,698 illustrates tapering of the mode-pulling layer 510 in a second dimension.

Figure 7:
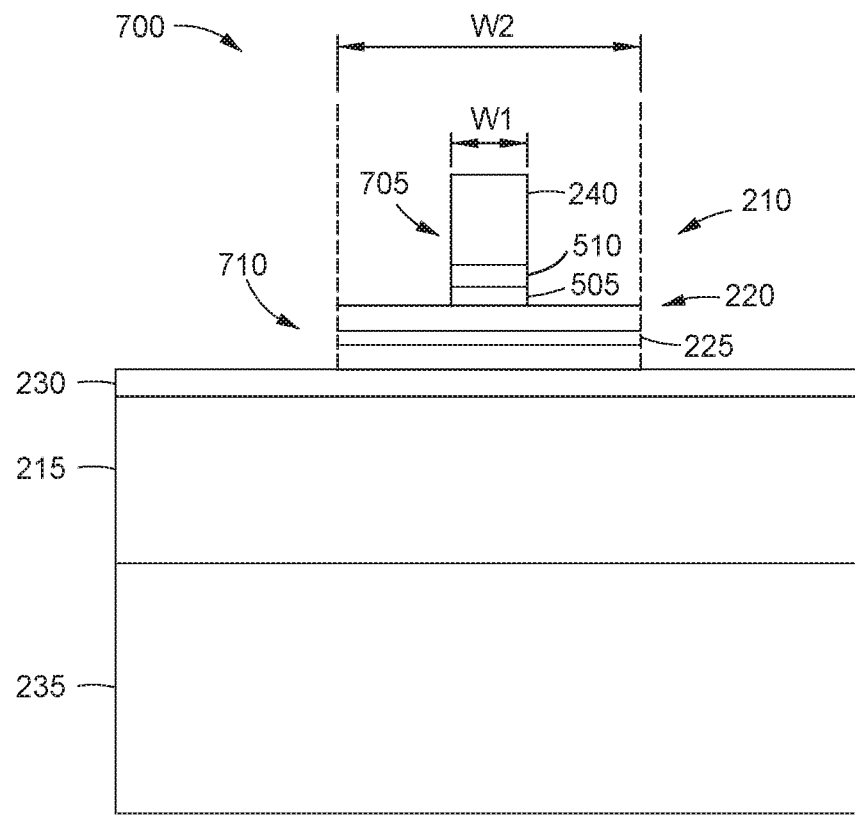
FIG. 7 is a diagram illustrating an implementation of an optical waveguide emitter having a ridge portion with different widths, according to one or more embodiments.
Figure 8:
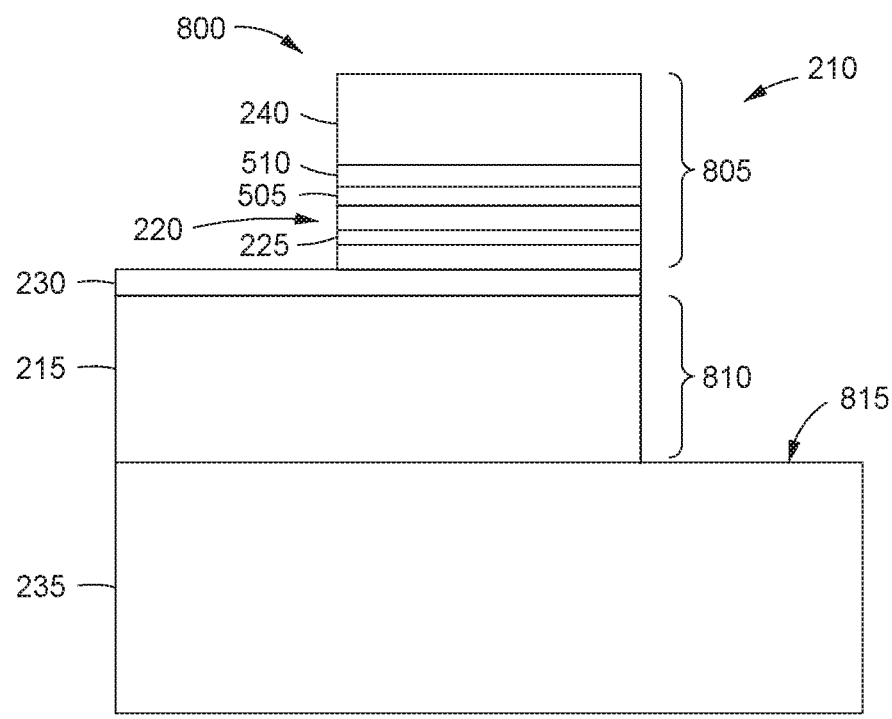
FIG. 8 is a diagram illustrating an implementation of an optical waveguide emitter having a reduced dimensioning of a first optical waveguide in a turning waveguide section, according to one or more embodiments.

FIG. 7 is a diagram 700 illustrating an implementation of an optical waveguide emitter having a ridge portion 210 with different widths, according to one or more embodiments. The optical waveguide emitter of the diagram 700 represents one example of the optical waveguide emitter 120 illustrated in FIG. 1.

In the diagram 700, the ridge portion 210 comprises a first region 705 having a width W1, arranged above a second region 710 having a width W2. The width W1 is less than the width W2. In this way, the ridge portion 210 of the optical waveguide emitter has two different widths W1, W2. The first region 705 comprises the spacer layer 505, the mode-pulling layer 510, and the second cladding layer 240, and the second region 710 comprises the second optical waveguide 220, which as shown includes the optically active region 225. In other implementations, the first region 705 and/or the second region 710 may have different compositions. Further, other implementations of the optical waveguide emitter having a ridge portion 210 with three or more widths are also contemplated.

Figure 9:
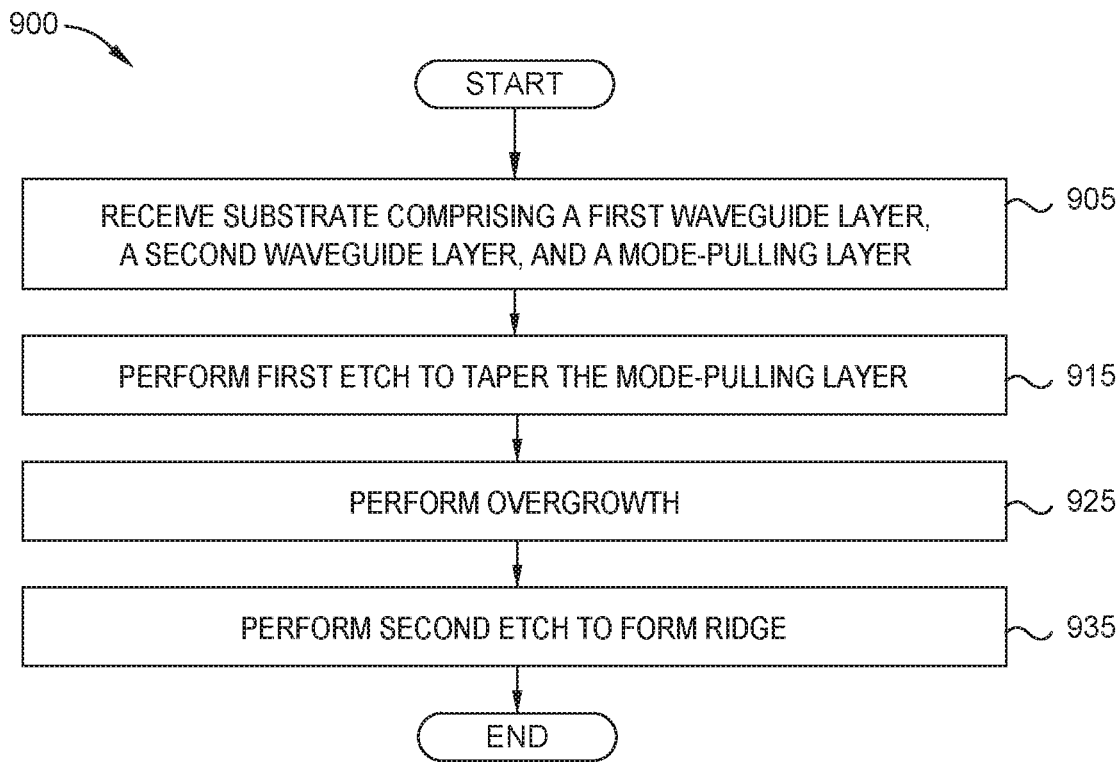
FIG. 9 illustrates an exemplary method for fabricating the optical waveguide emitter having a ridge portion with different widths, according to one or more embodiments.

In some embodiments, the different widths W1, W2 of the ridge portion 210 may be defined using distinct etching processes. FIG. 9 illustrates an exemplary method 900 for fabricating the optical waveguide emitter having a ridge portion 210 with different widths W1, W2. The method 900 begins at block 905, where a substrate is received that comprises a first waveguide layer, a second waveguide layer, and a mode-pulling layer. In some embodiments, the mode-pulling layer is arranged above the second waveguide layer, and the second waveguide layer is arranged above the first waveguide layer. The substrate may comprise additional layers such as optically active layers and/or spacer layers. At block 915, a first etch is performed to taper the mode-pulling layer. In some embodiments, a spacer layer between the mode-pulling layer and the second waveguide layer serves as an etch stop layer for the first etch. At block 925, an overgrowth is performed and semiconductor material is grown above the mode-pulling layer. At block 935, a second etch is performed to form the ridge portion of the optical waveguide emitter. In some embodiments, a spacer layer between the second waveguide layer and the first waveguide layer serves as an etch stop layer for the second etch. The method 900 ends following completion of block 935.

Refer now to FIG. 8, which is a diagram 800 illustrating an implementation of an optical waveguide emitter having a reduced dimensioning of the first optical waveguide 215 in the turning waveguide section, according to one or more embodiments. The reduced dimensioning of the first optical waveguide 215 in the turning waveguide section represents another example of a refractive index-increasing feature that may be implemented in an optical waveguide emitter. Further, the reduced dimensioning of the first optical waveguide 215 may be implemented independently or in conjunction with other refractive index-increasing feature(s), such as the mode-pulling layer 510.

In the diagram 800, the width of the first optical waveguide 215 is reduced in the turning waveguide section. As shown, the first optical waveguide 215 has a same lateral extent as the first cladding layer 235 on one side of the ridge portion 210, and has a lateral extent less than that of the first cladding layer 235 on the other side of the ridge portion 210. In some embodiments, a lateral exterior surface 810 of the first optical waveguide 215 is coplanar with a lateral exterior surface 805 of the ridge portion 210. In some embodiments, the lateral exterior surfaces 805, 810 define an outer radius of the turning waveguide section. In other embodiments, the lateral exterior surfaces 805, 810 need not be coplanar.

In some embodiments, the lateral exterior surfaces 805, 810 are formed by performing a deep etch that extends through the first optical waveguide 215. As shown, the deep etch extends through the ridge portion 210 to a top surface 815 of the first cladding layer 235. However, in other cases, the deep etch may extend through the top surface 815 and partly into the first cladding layer 235.

FIGS. 10A-10H illustrate an exemplary sequence of fabricating optical waveguide emitter with one or more refractive index-increasing features in a turning waveguide section, according to one or more embodiments. The features described in FIGS. 10A-10H may be used in conjunction with other embodiments described herein, e.g., to fabricate the optical waveguide emitters depicted in FIGS. 5, 7, and 8.

Figure 10A:
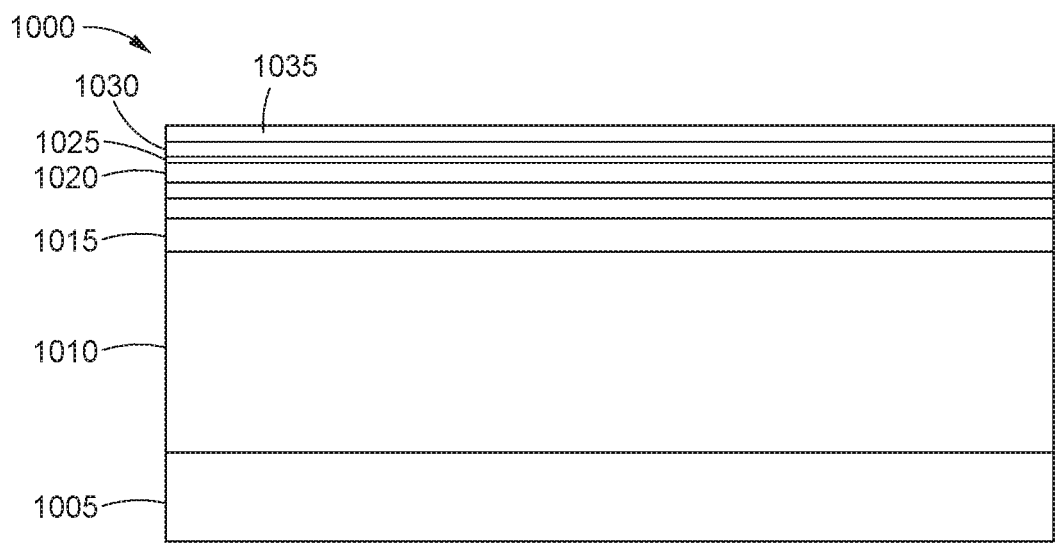
FIGS. 10A-10H illustrate an exemplary sequence of fabricating optical waveguide emitter with one or more refractive index-increasing features in a turning waveguide section, according to one or more embodiments.
Figure 10B:

Diagram 1000 of FIG. 10A is a cross-section view depicting a first stage in which a substrate having a plurality of epitaxially-grown layers is received. The first stage generally corresponds to the block 905 of the method 900 of FIG. 9. As shown, the substrate comprises a first cladding layer 1005, a first waveguide layer 1010 arranged above the first cladding layer 1005, a first spacer layer 1015 arranged above the first waveguide layer 1010, a second waveguide layer 1020 (which may include an optically active region) arranged above the first spacer layer 1015, a second spacer layer 1025 arranged above the second waveguide layer 1020, a mode-pulling layer 1030 arranged above the second spacer layer 1025, and a third spacer layer 1035 arranged above the mode-pulling layer 1030. Diagram 1040 of FIG. 10B represents a downward view at the level of the mode-pulling layer 1030 in the first stage.

Figure 10C:
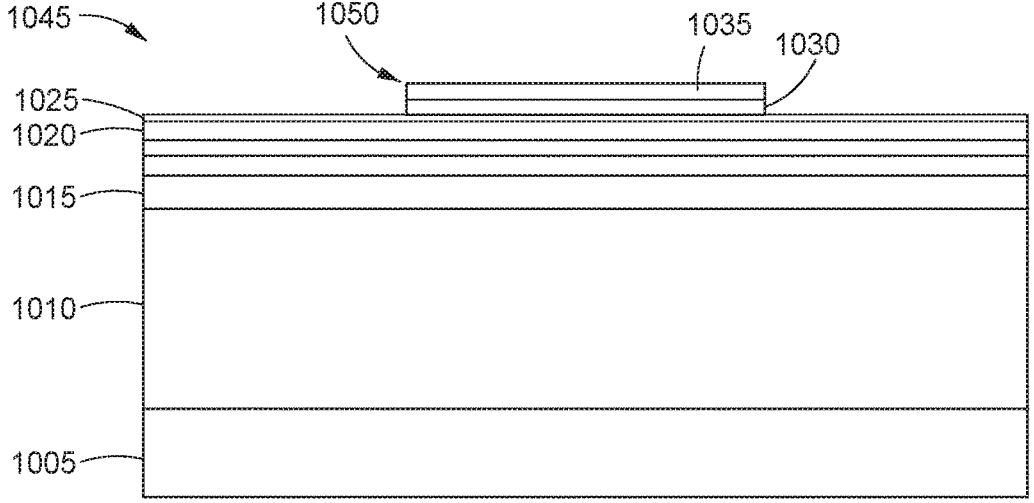
Figure 10D:
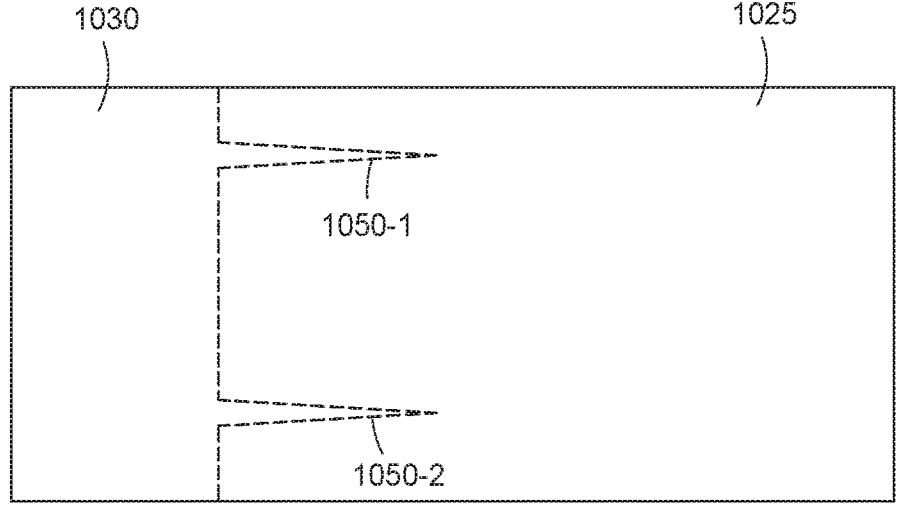

Diagram 1045 of FIG. 10C is a cross-section view depicting a second stage in which a first etch is performed to taper the mode-pulling layer 1030 (shown as taper pattern 1050). The second stage generally corresponds to the block 915 of the method 900 of FIG. 9. Two instances of the taper pattern 1050 are illustrated in diagram 1055 of FIG. 10D as taper patterns 1050-1, 1050-2, which correspond to an input and an output of the turning waveguide section.

Figure 10E:
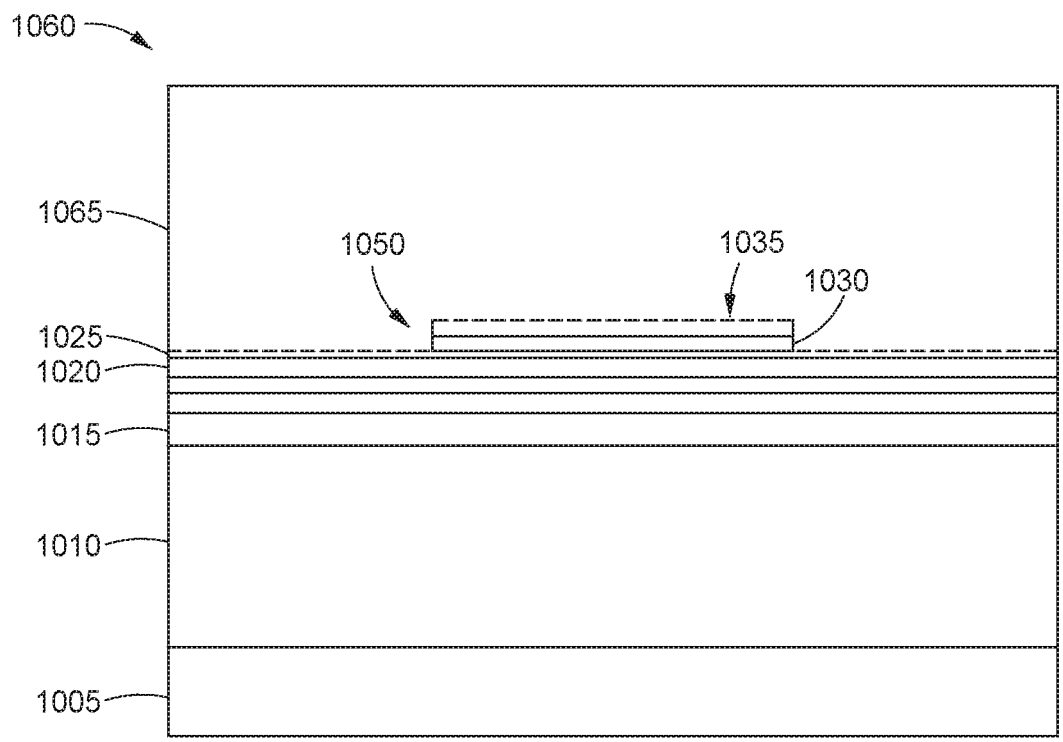
Figure 10F:
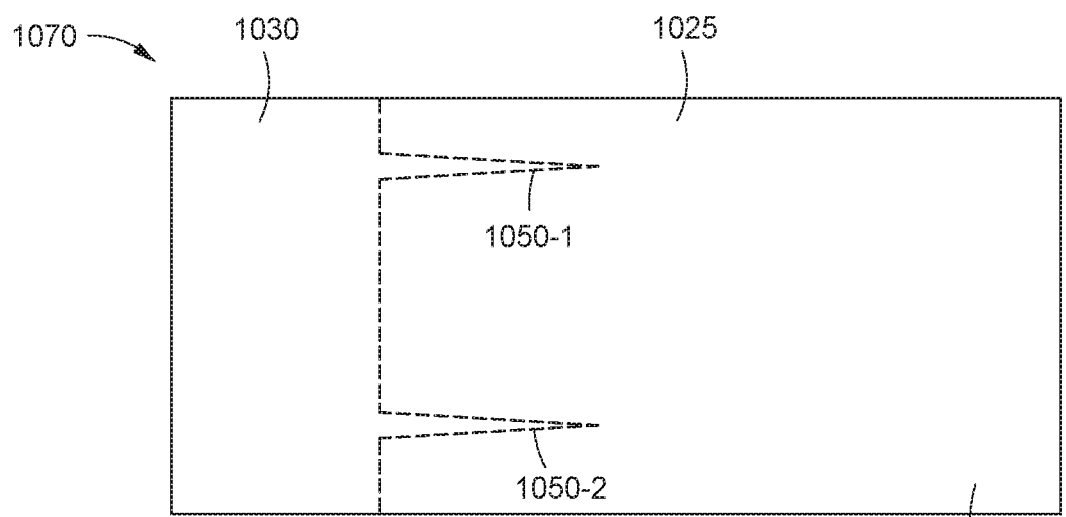

Diagram 1060 of FIG. 10E is a cross-section view depicting a third stage in which semiconductor material 1065 is grown above the mode-pulling layer 1030. Diagram 1070 of FIG. 10F represents a top view at the third stage. The third stage generally corresponds to the block 925 of the method 900 of FIG. 9.

Figure 10G:
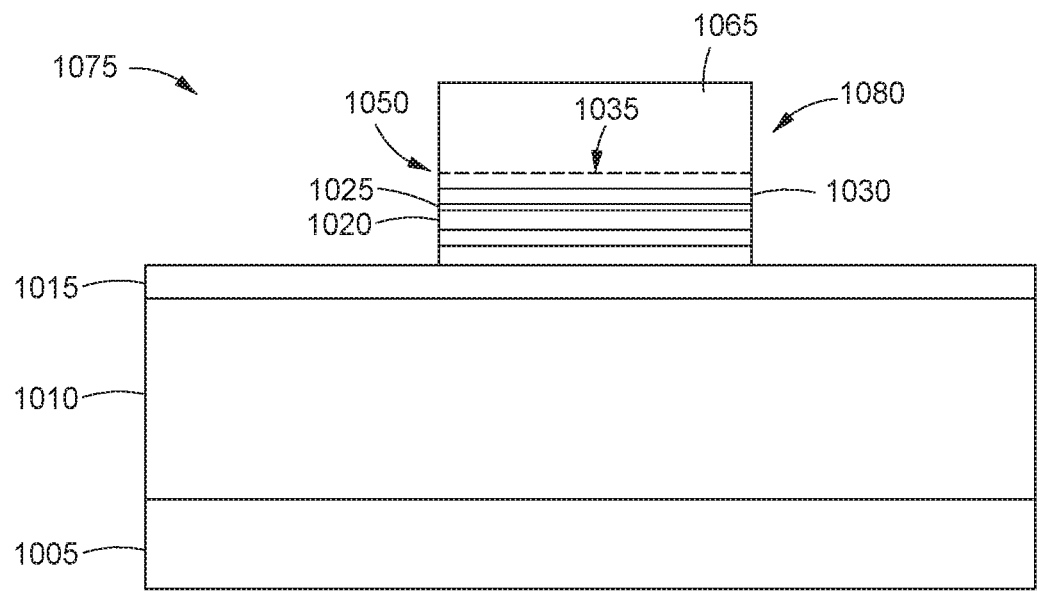
Figure 10H:
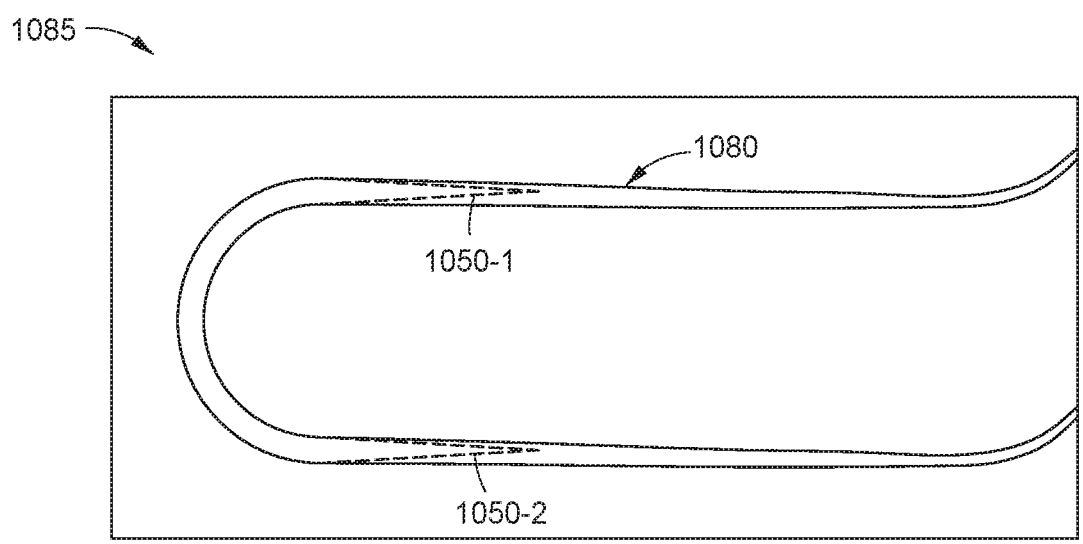

Diagram 1075 of FIG. 10G is a cross-section view depicting a fourth stage in which a second etch is performed to form a ridge portion 1080 of the optical waveguide emitter. Diagram 1085 of FIG. 10H represents a top view at the fourth stage. The fourth stage generally corresponds to the block 935 of the method 900 of FIG. 9. Although not shown here, in other embodiments the first etch and second etch may provide the ridge portion 1080 with different widths, may provide the first waveguide layer 1010 with reduced dimensioning, and so forth.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical waveguide emitter comprising:
a first optical waveguide in a base portion and a second optical waveguide in a ridge portion extending from the base portion, wherein the first optical waveguide and the second optical waveguide are evanescently coupled and collectively configured to selectively propagate only a first mode of a plurality of optical modes, wherein each of the first optical waveguide and the second optical waveguide extend through an input waveguide section, a turning waveguide section, and an output waveguide section, and wherein one or more of the input waveguide section, the turning waveguide section, and the output waveguide section comprises an optically active region; and
a refractive index-increasing feature in the turning waveguide section, wherein the refractive index-increasing feature directs the first mode away from the first optical waveguide into the second optical waveguide.

2. The optical waveguide emitter of claim 1,
wherein the input waveguide section extends from a facet to a first end of the turning waveguide section, and
wherein the output waveguide section extends to the same facet from a second end of the turning waveguide section opposite the first end.

3. An optical waveguide emitter comprising:
a first optical waveguide and a second optical waveguide that are evanescently coupled and collectively configured to selectively propagate only a first mode of a plurality of optical modes, wherein each of the first optical waveguide and the second optical waveguide extend through an input waveguide section, a turning waveguide section, and an output waveguide section, and wherein one or more of the input waveguide section, the turning waveguide section, and the output waveguide section comprises an optically active region; and
a refractive index-increasing feature in the turning waveguide section,
wherein the first optical waveguide is disposed in a base portion,
wherein the second optical waveguide is disposed in a ridge portion extending from the base portion, and
wherein the refractive index-increasing feature comprises a mode-pulling layer arranged in the ridge portion above the second optical waveguide.

4. The optical waveguide emitter of claim 3,
wherein the second optical waveguide has a first width, and
wherein the mode-pulling layer has a second width less than the first width.

5. The optical waveguide emitter of claim 1, wherein the refractive index-increasing feature comprises a reduced dimensioning of the first optical waveguide in the turning waveguide section.

6. The optical waveguide emitter of claim 5, wherein, with the reduced dimensioning of the first optical waveguide, a lateral exterior surface of the ridge portion is coplanar with a lateral exterior surface of the first optical waveguide.

7. The optical waveguide emitter of claim 1,
wherein a first transition waveguide section extends between the turning waveguide section and one of: (i) the input waveguide section and (ii) the output waveguide section,
wherein the first transition waveguide section is configured to gradually change an optical confinement of a propagating optical signal.

8. The optical waveguide emitter of claim 7, wherein the first transition waveguide section comprises one or more layers providing a tapering in one or more dimensions.

9. The optical waveguide emitter of claim 7, wherein the optical waveguide emitter further comprises:
a second transition waveguide section extending between the turning waveguide section and the other of (i) and (ii).

10. The optical waveguide emitter of claim 1, wherein the first optical waveguide comprises an alternating arrangement of high effective index layers and low effective index layers.

11. The optical waveguide emitter of claim 1, wherein the optically active region comprises one or more of quantum wells, quantum dots, and quantum wires.

12. An optical system comprising:
   a photonic chip comprising an optical component having a predefined height relative to a first surface of the photonic chip;
   a semiconductor substrate having a second surface; and
   an optical waveguide emitter contacting the second surface, the optical waveguide emitter comprising:
      a first optical waveguide in a base portion and a second optical waveguide in a ridge portion extending from the base portion, wherein the first optical waveguide and the second optical waveguide are evanescently coupled and collectively configured to selectively propagate only a first mode of a plurality of optical modes, wherein each of the first optical waveguide and the second optical waveguide extend through an input waveguide section, a turning waveguide section, and an output waveguide section, and wherein one or more of the input waveguide section, the turning waveguide section, and the output waveguide section comprises an optically active region; and
      a refractive index-increasing feature in the turning waveguide section, wherein the refractive index-increasing feature directs the first mode away from the first optical waveguide into the second optical waveguide,
   wherein, when the second surface contacts the first surface, one of the first optical waveguide and the second optical waveguide is optically aligned with the optical component in at least one dimension.

13. The optical system of claim 12,
   wherein the input waveguide section extends from a facet to a first end of the turning waveguide section, and
   wherein the output waveguide section extends to the same facet from a second end of the turning waveguide section opposite the first end.

14. The optical system of claim 12, wherein the optical component comprises a spot size converter configured to adjust a mode size of a propagating optical signal.

15. The optical system of claim 12,
   wherein the refractive index-increasing feature comprises a mode-pulling layer arranged in the ridge portion above the second optical waveguide.

16. The optical system of claim 15,
   wherein the second optical waveguide has a first width, and
   wherein the mode-pulling layer has a second width less than the first width.

17. The optical system of claim 12, wherein the refractive index-increasing feature comprises a reduced dimensioning of the first optical waveguide in the turning waveguide section.

18. The optical system of claim 17, wherein, with the reduced dimensioning of the first optical waveguide, a lateral exterior surface of the ridge portion is coplanar with a lateral exterior surface of the first optical waveguide.

19. The optical system of claim 12, wherein the optical waveguide emitter further comprises:
   a first transition waveguide section that extends between the turning waveguide section and one of: (i) the input waveguide section and (ii) the output waveguide section,
   wherein the first transition waveguide section is configured to gradually change an optical confinement of a propagating optical signal.

20. The optical system of claim 12, wherein the first optical waveguide comprises an alternating arrangement of high effective index layers and low effective index layers.

* * * * *